May 1, 1951  M. P. WINTHER  2,551,079
BRAKE
Filed July 1, 1946  2 Sheets-Sheet 1

Martin P. Winther,
Inventor.
Haynes and Koenig,
Attorneys.

May 1, 1951  M. P. WINTHER  2,551,079
BRAKE
Filed July 1, 1946  2 Sheets-Sheet 2

Martin P. Winther,
Inventor.
Haynes and Koenig,
Attorneys.

Patented May 1, 1951

2,551,079

UNITED STATES PATENT OFFICE 2,551,079

BRAKE

Martin P. Winther, Waukegan, Ill., assignor to said Martin P. Winther, as trustee Application July 1, 1946, Serial No. 680,720

5 Claims. (Cl. 254—173)

This invention relates to brakes, and with regard to certain more specific features to a composite eddy-current and mechanical brake system for hoists such as oil well draw-works and the like.

Among the several objects of the invention may be noted the provision of a long-wearing, inexpensive brake system combining the advantages of mechanical and eddy-current brake systems; the provision of a brake system that continuously and positively controls over a wide range of speeds; the provision of a composite brake system in which the elements are controllable either commonly or independently, and in which the elements act either simultaneously or consecutively; and the provision of automatic means for the purpose that are dependable in action and simple in operation. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a diagrammatic side elevation of an oil well drilling rig;

Similar reference characters indicate corresponding parts throughout the several views of the drawings.

The use of hydraulic reaction brakes for stopping heavy loads has the disadvantage of generating insufficient torque at low speeds. This is due to the inherent characteristics of brakes of this type which generate a torque that is proportional to some exponential value of the speed. Thus, as the speed approaches zero, the torque will rapidly decrease. Mechanical brakes of the friction type have sufficient torque at low speeds but have short life at high speeds and require frequent replacement of the friction surfaces due to rapid wear. Electromagnetic brakes of the eddy-current type produce high torque at low speeds, and have long operating life, but they are unable to hold a load stationary at zero speed. Coordination of the various types of brakes has heretofore been unsuccessful because of improper operating conditions and complexities.

By means of the present invention is provided a combination of an electromagnetic brake and a mechanical brake possessing the advantages of each system but without its disadvantages. It effects simplified, independent, simultaneous, consecutive, or variably concurrent operations, without requiring great skill in coordination of several manual devices used.

A system such as is indicated in this invention is of great value to the oil well drilling industry, for example. In drilling an oil well it is necessary to replace the bit at the end of the drill pipe at frequent intervals. To make this operation as economical and as safe as is possible, several requirements must be met. The drill pipe must be rapidly removed from the well and sections of pipe must be expeditiously disconnected. After the bit is replaced the drill pipe sections must be rapidly fitted together and controllably lowered into the well. A device that will fulfill these requirements safely, economically and simply is described below.

Figure 1:
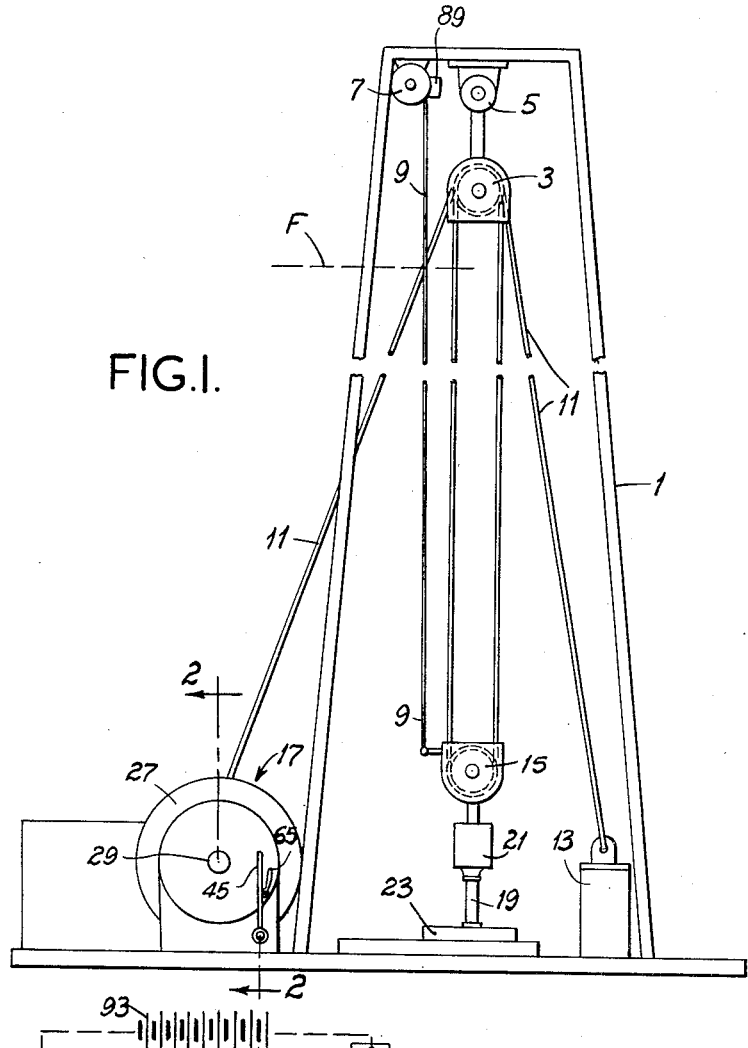

Referring now more particularly to Fig. 1, an oil well derrick tower 1 is shown supporting an upper block 3 by means of a bracket 5. A block and tackle composed of upper block 3, a lower block 15 and a cable 11 is powered by means of a draw-works hoist 17, and acts on a drill pipe section 19. One end of cable 11 is attached to an anchor 13. Pipe section 19 is connected to lower block 15 by connector 21. A rotary drill table 23 is shown centered at the base of the derrick tower 1.

Figure 2:
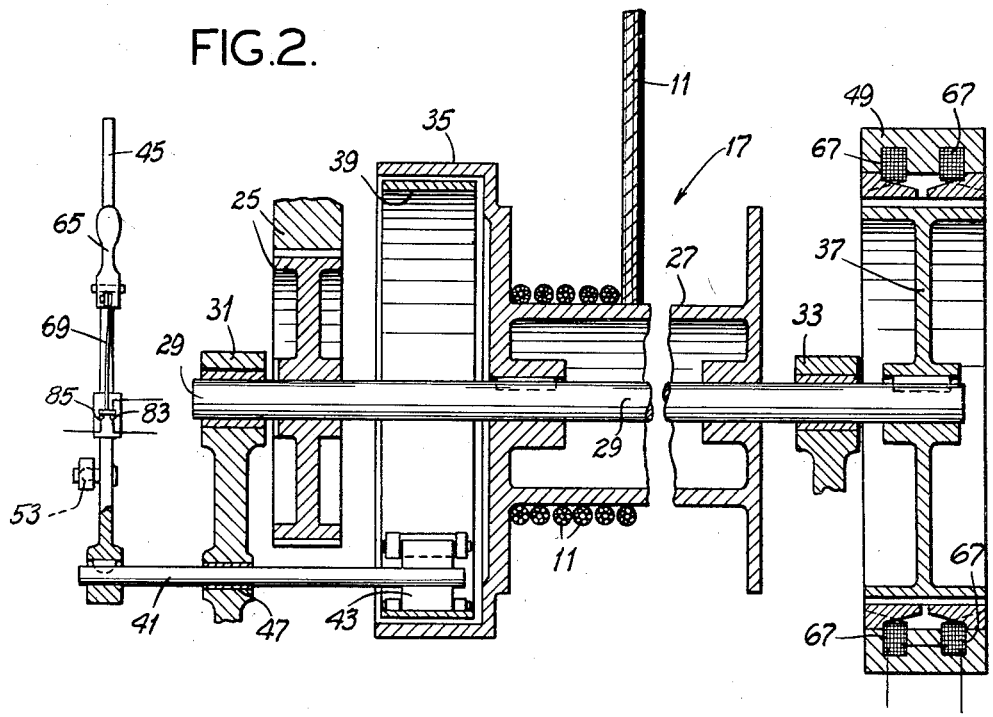
Fig. 2 is an enlarged vertical section taken along line 2—2 of Fig. 1.

The draw-works hoist 17 is shown in Fig. 2. It is powered by mechanical means acting through a gear drive 25, which transmits the applied torque through shaft 29 to a keyed cable drum or hoisting sheave 27. This shaft 29 is supported by two bearings 31 and 33, and has keyed to it a brake drum 35, an inductor member 37 of an electromagnetic type brake and the cable drum 27. A brake shoe 39, which is engageable with the brake drum 35, has its action controlled by a shaft 41 and a toggle linkage 43. Shaft 41 is keyed to a hand-lever 45 and is supported centrally by a bearing 47. The movable inductor member 37 is enclosed by a stationary, toothed stator and field member 49, the general form of which is like the brake B in U. S. Patent 2,286,777. Specifically, however, the teeth of the field member are constructed along the lines disclosed in U. S. Patent 2,367,636. Its annular field coils are indicated at 67.

Figure 3:
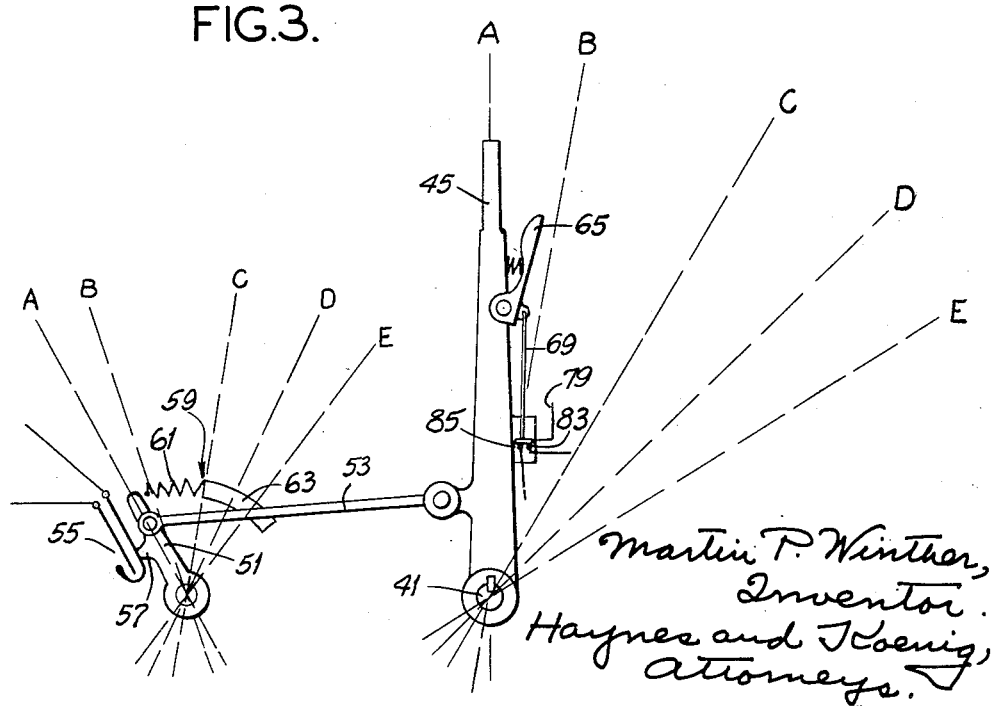
Fig. 3 is a diagrammatic view illustrating the coordination of certain controls.

The hand-lever 45, as shown in Fig. 3, is mechanically linked through a link 53 to a movable rheostat arm 51. The rheostat arm 51 is shown in a disengaged position. In this position a spring-actuated switch 55, which may be of the so-called micro type, is held open by the action of a projection 57 on arm 51. A rheostat winding 59 is provided, composed of a section 61 of resistance wire and a section 63 of highly conductive metal. A trigger-lever 65 by means of a link 69 controls a spring-actuated, double-pole, single-throw switch having contacts 83 and 85. This may be of the micro type. Switch contacts 83 and 85 are normally closed. They are opened by the application of pressure on the trigger-lever 65.

Figure 4:
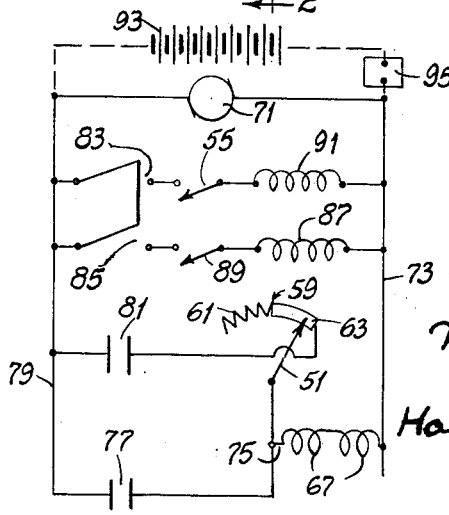
Fig. 4 is an electrical circuit diagram.

Referring now to Fig. 4, an over-all, simplified electrical circuit is shown. The windings 67 of the stationary field member 49 are connected by a wire 73 to one side of a direct-current power source 71. To complete the electrical circuit of windings 67, two parallel electrical paths are provided. One path is a shunt through a wire 75, a contactor 77 and wire 79 to the other side of the power source 71. The second path (shunted by 77) is through wire 75, the rheostat arm 51, rheostat winding 59, a contactor 81 and wire 79, also to the other side of the power source 71. Contactor 77 is controlled by an actuating coil 87, and, similarly, contactor 81 is controlled by an actuating coil 91. For coil 91 to be energized from the power source 71, the switch 55 and switch contact 83 must be closed. Similarly, for coil 87 to be energized switch 85 and switch contact 89 must be closed. The two switch contacts 83 and 85 are the two elements of the double-pole, single-throw switch shown in Figs. 2 and 3. Switch 89, which could be classed as a limit switch, is shown in Fig. 1 and is activated by the movement of a spring-loaded reel 7 and a control cable 9, the latter being attached for motion with the lower part 15 of the hoisting tackle. Switch 89 is normally open, and is closed only when block 15 is higher than a predetermined height F, indicated in Fig. 1.

The action of hand-lever 45 is as follows: In position A (Fig. 3) neither the band-type brake or the electromagnetic brake is activated. The electromagnetic brake is not energized, as rheostat arm 51 is not in contact with the rheostat winding 59, assuming that the contactor 77 is also open. The action of this contactor 77 will be described later. If hand-lever 45 is then moved to position B the electromagnetic brake will be energized through section 61 of rheostat 59, and contactor 81. The latter in position B is closed by the energization of coil 91 through closure of switch 55. Switch 55 is closed as soon as hand-lever 45 is moved from position A. Part of this circuit is switch contact 83, which is normally closed.

As hand-lever 45 is moved to position C, an increasing amount of resistance winding 61 of rheostat 59 is removed from the circuit, causing an increasing current through windings 67, with an increase in eddy-current electromagnetic braking effect in the rotor 37. At position C two actions occur simultaneously. First, the resistance of rheostat 59 becomes effectively zero due to the rheostat arm 57 contacting the highly conductive section 63, and second, the brake shoe 39 begins to expand. As hand-lever 45 is moved toward position E, the brake shoe 39 is gradually increasingly expanded, causing an increased mechanical braking force. The electromagnetic brake continues fully to be energized during this movement.

At point D a condition exists wherein the mechanical brake is partially energized and the electromagnetic brake is fully energized. At point E, both the mechanical and the electromagnetic brake are fully energized.

To describe the action of the apparatus of this invention several operational examples will be used such as occur in oil well drilling.

The first operation to be performed is that of lowering several sections of drill pipe into an oil well. Initially block 15 is raised to a height great enough to permit the attachment of connector 21 to a drill pipe section 19. For illustration, assume that the length of a section of drill pipe is 90 feet. At this time, the hand-lever is in position E of Fig. 3, and the friction brake and the electromagnetic brake are both fully energized.

If by chance hand-lever 45 is inadvertently moved to position A before the drill pipe section 19 is ready to be lowered, no accident will occur, since the electromagnetic brake will not be de-energized. This safety provision is due to the contactor 77, which will always be energized by switch 89 as long as block 15 is above height F and trigger-lever 65 is not activated. If the trigger-lever 65 is accidently pushed while hand-lever 45 is in position E (which is the more likely position in which this inadvertence might occur), the electromagnetic brake would be deenergized due to the opening of switches 83 and 85, but the band-type brake would then prevent the drill pipe section 19 from dropping. It is to be understood that in the initial position, with the block 15 higher than line F, the electromagnetic brake will remain energized through contactor 77. This is due to the limit switch 89 being closed. It is necessary to move hand-lever 45 to position A and to operate trigger lever 65 before the drill pipe section 19 and block 15 may be lowered.

After the necessary connection and alignment of the drill pipe section 19 have been effected, the hand-lever is moved to position A while the trigger lever 65 is squeezed. This action sets both brake systems to release, and the pipe section immediately descends. It is desirable that this falling be as unchecked as possible to conserve time, but it is necessary finally to stop the pipe section 19 positively, safely and without undue wear on the components of the draw-works. As the load is frequently as high as 400,000 pounds and a free drop of 80 feet is desired, the peripheral speed of the cable drum 27 will frequently rise to at least 700 R. P. M., requiring large braking means completely to stop the downward movement in the distance of less than 10 feet. To do this the operator merely moves the hand-lever 45 from position A to position E. The braking effect of the electromagnetic brake is increasingly applied as the hand-lever 45 is so moved. The electromagnetic brake of the type described has an adequate capacity to snub the falling load from the high velocity to a speed low enough to permit insertion of slips, or tapered blocks, between the drill pipe section 19 and the rotary drill table 23. Although the band-type brake has sufficient capacity completely to stop the load, it is used principally to hold the drill pipe 19 in a stationary position, and to serve as a safety device if there is any failure of the electromagnetic brake or its slips. Although the mechanical brake is increasingly activated as the hand-lever 45 is moved toward position E, the design is such that a large proportion of the braking force is supplied by the electromagnetic brake, and wear on the friction surfaces of the mechanical brake becomes negligible.

To remove drill pipe sections 19 from a well, the following procedure is followed. With the block 15 attached to drill pipe section 19 and the handle in position A, power is supplied to gear 25 in such a manner as rapidly to move upward pipe section 19 and block 15. The hand-lever is moved toward position E at the time that it is desired to check upward movement. This first applies increasing electromagnetic braking effect, then full electromagnetic and increasing mechanical braking effect and finally the full braking force to cable drum 27. The source of power to drive gear 25 is preferably removed whenever hand-lever 45 is moved toward position E; that is to say, whenever any braking action is applied to the drum.

One of the features of this invention is the use of the limit switch 89, connected in effect with the reel 7 and the cable 9, as an automatic braking control and as a safety device. If the hand-lever 45 is not moved toward position E as the block 15 and pipe section 19 approach the top of derrick tower 1, limit switch 89 will be automatically closed as block 15 rises above height F. This action will actuate contactor 77, thereby fully energizing the electromagnetic brake, and will thus prevent the block 15 from being forced against block 3. Hence the operator may reel up the load quickly by operating the draw-works at full speed and be assured of a snubbing action at the desired upper end of the travel without damage to the top of the tower. When the snubbing takes place, he turns off the power which drives the drum 27.

As a further safety measure, batteries 93 are connected so as automatically to power the electromagnetic brake upon any failure of power source 71. A normally open automatic relay 95 is used to connect battery 93, relay 95 being closed only during failure time of the power source 71.

It will be seen from the above that movement of the mechanical brake toward application, because of immediate closure of switch 55, and electrical relay action through coil 91 and switch 81, closes the circuit through the modulating means 61. The coil 91 and switch 81 may be referred to as a relay for the purpose. Also, the provision of the low-resistance element 63 for movement in the modulator permits the mechanical brake to be set fully after complete application of the eddy-current brake. In addition, the limit switch 89, by energizing the relay coil 87 and switch 77, provides a by-pass circuit around the modulator 61 for exciting the coils 67, thereby assuring, upon a withdrawal of the draw-works, of a maximum eddy-current braking action irrespective of the position of the mechanical means for setting the mechanical brake.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A braking system for a hoisting drum or the like, comprising an eddy-current brake associated with the drum, a friction brake associated therewith, a circuit for energizing the eddy-current brake, modulating means in said circuit responsive to application of the friction brake for increasing the excitation and braking operation of the eddy-current brake, means responsive to a predetermined amount of hoisting action for applying the eddy-current brake without said modulation, and independently operable means for releasing the eddy-current brake when the friction brake is released.

2. Braking apparatus comprising a hoist, an eddy-current brake and a friction brake therefor, movable mechanical means for applying and releasing the friction brake, a circuit for exciting the eddy-current brake, control means in said circuit responsive to application movement of the mechanical brake for applying the eddy-current brake with modulation prior to mechanical braking action, said control means having movement beyond its modulating movement whereby the friction brake may be finally applied after application of the eddy-current brake, and means responsive to movement of the hoist to a predetermined position for fully applying the eddy-current brake without modulation regardless of the position of the mechanical brake.

3. A braking system for load hoists and the like comprising an eddy-current brake and a friction brake for the hoist, a circuit for exciting the eddy-current brake, a movable member for setting the friction brake, a modulator in a part of said circuit for modulating excitation of the eddy-current brake, a first relay switch in said part of the circuit responsive to said member when the latter is moved in a direction toward setting the friction brake whereby the modulator is made operative, the eddy-current brake being increasingly excited to a desired maximum before the friction brake is fully set, a second relay switch in said circuit responsive to a predetermined elevated position of the load for fully exciting said eddy-current brake independently of the modulating positions of said movable member, and independent control means for opening both relay switches to permit said load to descend when said member is in its position of release in respect to the friction brake.

4. A braking system for hoists and the like comprising an eddy-current brake and a friction brake for the hoist, a circuit for exciting the eddy-current brake, a first movable member for setting the friction brake, a modulator in said circuit for modulating excitation of the eddy-current brake, first switch apparatus in said circuit including elements responsive to said first movable member when the latter is moved in a direction toward setting the friction brake to make the modulator operative to control the eddy-current brake before the friction brake is fully set, second switch apparatus in said circuit including elements responsive to a predetermined position of the hoist for exciting said eddy-current brake, and an independently controlled second movable member for opening both switch apparatuses in any position of the first movable member.

5. A braking system for load hoists and the like comprising an eddy-current brake and a friction brake for the hoist, a circuit for exciting the eddy-current brake, a first movable member for setting the friction brake, a modulator in a part of said circuit for modulating excitation of the eddy-current brake, a shunt around said modulator part for unmodulated excitation of the eddy-current brake, relay contacts in said shunt and shunted parts of the circuit, parallel connections across said circuit respectively for relay coils operating said relay contacts, independently movable switch mechanism for opening both of said parallel connections, a limit switch responsive to a predetermined position of the load and located in the parallel connection controlling the relay contact in the shunt to close the latter, and a switch in the other parallel connection responsive to movement of the first movable member toward a position to set the friction brake and adapted to close the relay contact in the modulator part of the circuit.

MARTIN P. WINTHER.

REFERENCES CITED

The following references are of record in the file of this patent:

UNITED STATES PATENTS

| Number | Name | Date |
|---|---|---|
| 747,707 | Hiss et al. | Dec. 22, 1903 |
| 1,839,096 | Haalmeijer et al. | Dec. 29, 1931 |